J. O. PARKER.
MACHINE FOR MAKING WOOD SHANK STIFFENERS.
APPLICATION FILED MAR. 28, 1917.

1,259,125. Patented Mar. 12, 1918.
4 SHEETS—SHEET 1.

Inventor,
John O. Parker

J. O. PARKER.
MACHINE FOR MAKING WOOD SHANK STIFFENERS.
APPLICATION FILED MAR. 28, 1917.
1,259,125.
Patented Mar. 12, 1918.
4 SHEETS—SHEET 2.
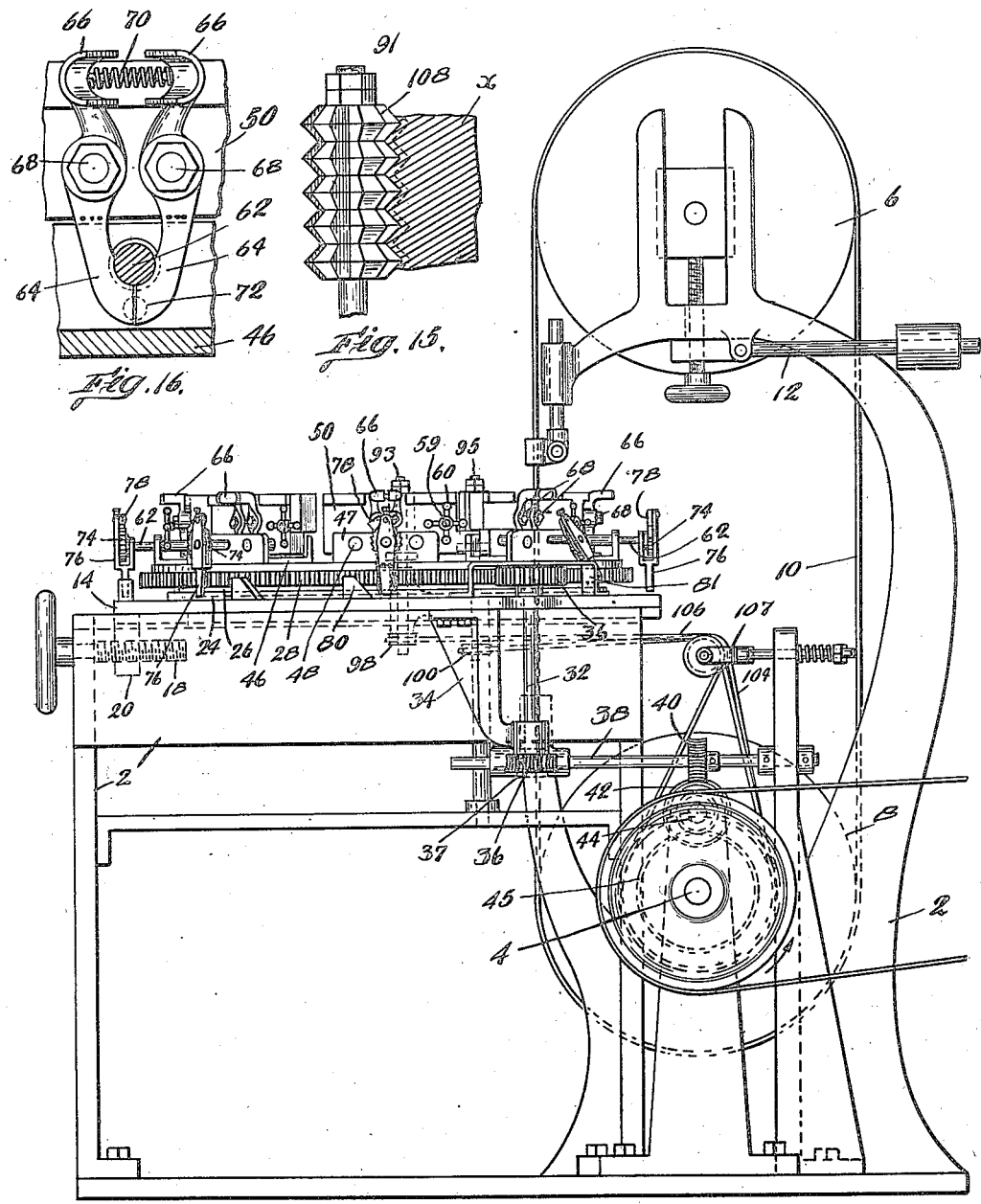

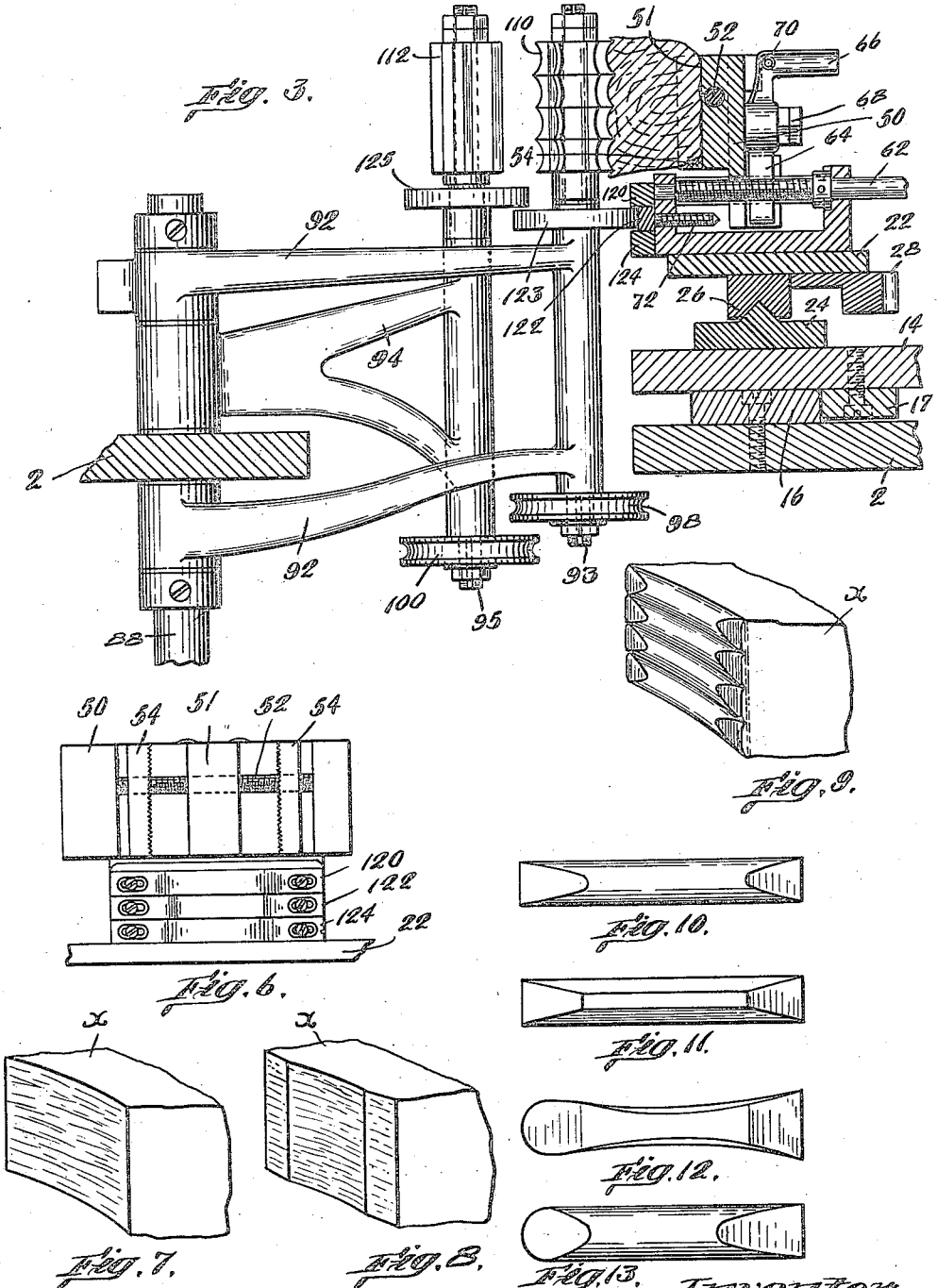

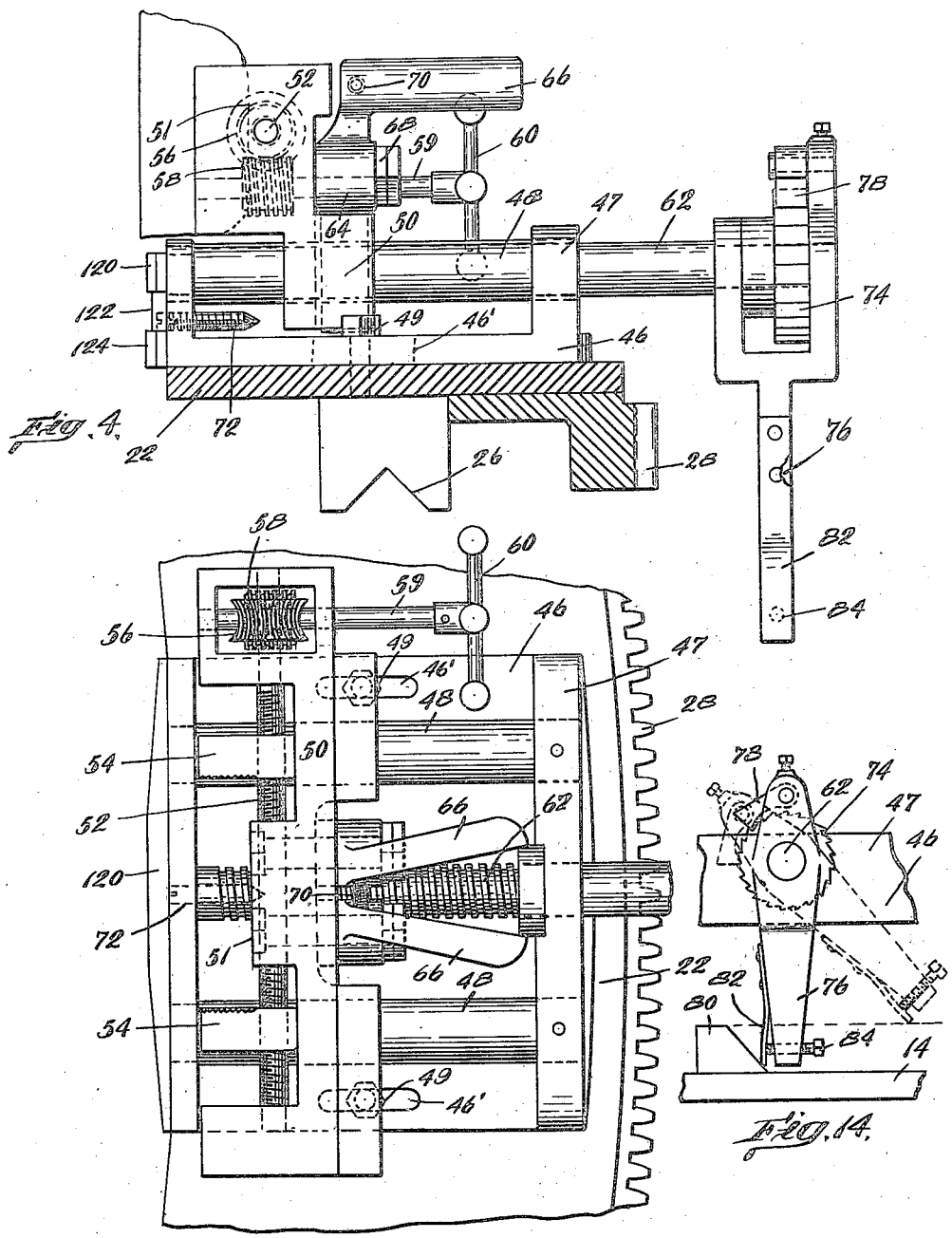

UNITED STATES PATENT OFFICE.

JOHN O. PARKER, OF WHITMAN, MASSACHUSETTS, ASSIGNOR OF ONE-HALF TO E. PAINE BLANCHARD, OF EAST BRIDGEWATER, MASSACHUSETTS.

MACHINE FOR MAKING WOOD SHANK-STIFFENERS.

1,259,125.  Specification of Letters Patent.  Patented Mar. 12, 1918.

Application filed March 28, 1917. Serial No. 158,087.

*To all whom it may concern:*

Be it known that I, JOHN O. PARKER, a subject of the King of Great Britain, and a resident of Whitman, county of Plymouth, and State of Massachusetts, have invented an Improvement in Machines for Making Wood Shank-Stiffeners, of which the following is a specification.

This invention relates to a machine for automatically forming wood-shank-stiffeners for shoes, and has for its object to provide a machine which will automatically produce completed wood-shank-stiffeners in large quantities and in a short period of time, so that they may be produced at small expense, and which may also be readily adapted to produce stiffeners of different forms.

I accomplish these objects by the means shown in the accompanying drawings, in which a preferred embodiment of my invention is shown and in which:—

Fig. 2 is a side elevation thereof.

Fig. 3 is a sectional view on an enlarged scale, taken at line 3—3 of Fig. 1.

Figs. 4 and 5 are, respectively, a detail side elevation and a plan view of one of the work holders.

Fig. 6 is a front elevation of a holder.

Figs. 7, 8 and 9 are perspective views of a wood block showing successive stages of the operation thereon.

Figs. 10 to 13 are plan views of different forms of stiffeners which may be produced.

Fig. 14 is a detail view of the feed-operating mechanism which I employ.

Fig. 15 is a detail view of one of the cutters.

Fig. 16 is a detail view of the feed screw disconnecting means.

Figure 1:
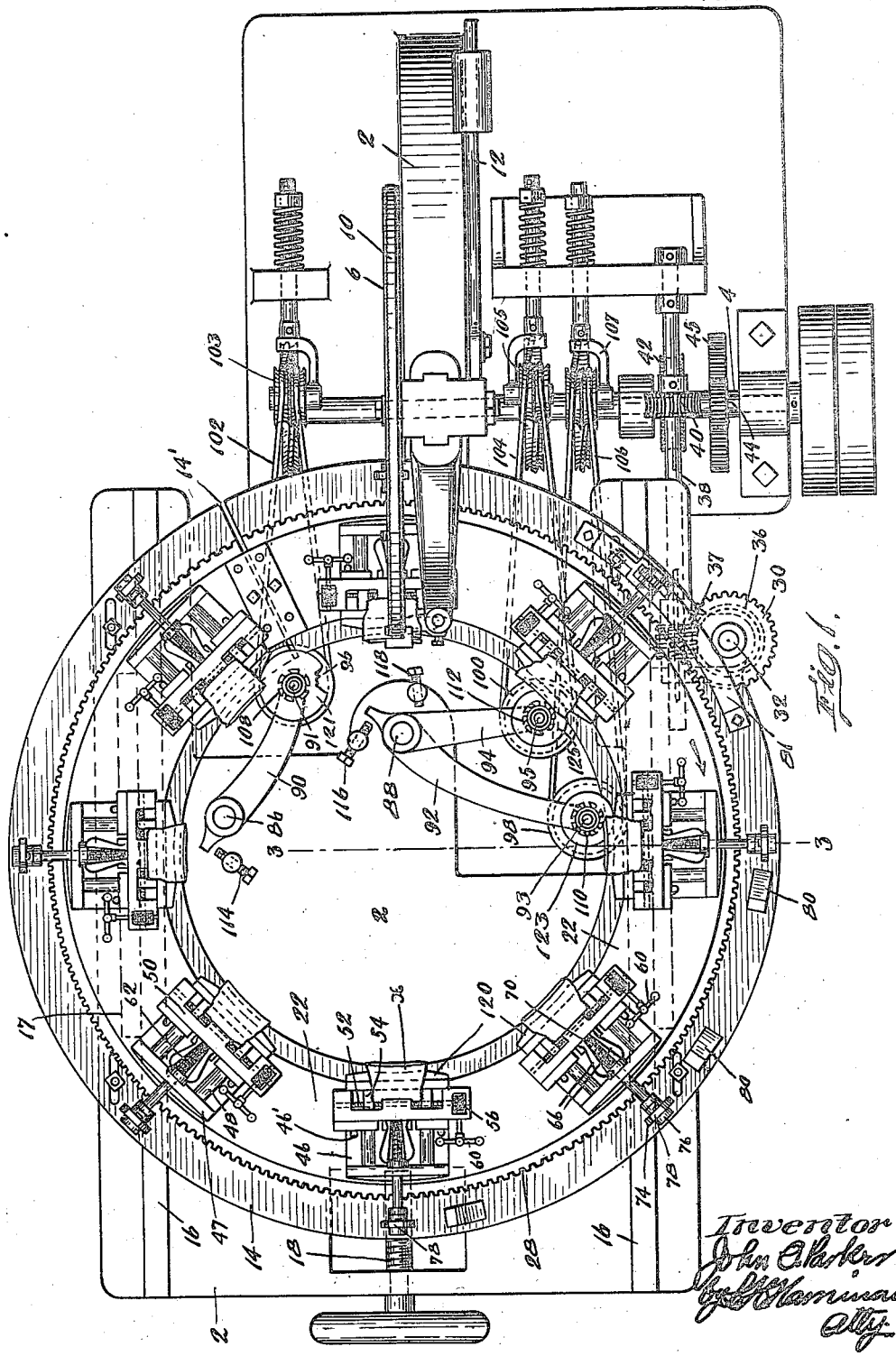
Figure 1 is a plan view of the machine.

As shown in the drawings, the main frame 2 has a main driving shaft 4 journaled therein, which is driven in the direction indicated by the arrow in Fig. 1. A band-saw pulley 6 is journaled in the upper portion of the frame, so that its axis lies in the vertical plane of the axis of shaft 4, and a similar pulley 8 is secured on the shaft 4, a band, or belt saw 10 being arranged on both pulleys and being held taut by a weighted lever 12, in a well known manner.

An annular, or ring shaped table 14 is mounted to slide upon guideway blocks 16, on a horizontal supporting portion formed with the frame 2, which are engaged by ribs 17 on the table, (see Fig. 3) so that it is horizontally adjustable in lines parallel to the plane of the band-saw-pulleys 6 and 8, the particular adjusting means shown consisting of an adjusting screw 18 swiveled in the frame and threaded in a depending lug 20 on the table. A flat, annular, or ring shaped carrier 22, having approximately the same internal and external diameters as the table 14, is mounted to move circularly on the latter, the table being provided with a circular track 24, which is arranged in a corresponding groove formed in a rib 26 on the under side of the carrier. The carrier 22 is provided with a gear 28 on its outer periphery, arranged in mesh with a gear 30 on a vertical shaft 32, journaled in the table 14, and in a bracket 34 depending therefrom, said shaft 32 having a worm-gear 36 on its lower end, arranged in mesh with a similar gear 37, splined on a horizontal shaft 38, also journaled in bracket 34, and in the frame, and having a worm gear 40 thereon arranged in mesh with a similar gear 42, on a shaft 44, which is geared to the main shaft 4 by a gear 45. By this arrangement the carrier 22 will be driven in the direction of the arrow in Fig. 1 when the shaft 4 is rotated, as already indicated.

According to my invention the band saw 10 is arranged so that its downwardly moving, or working portion passes within the inner peripheries of both the table 14 and carrier 22, and in close proximity thereto. To permit the saw blade to be placed therein both table and carrier are cut or slotted through, radially, as at 14' in Fig. 1, so that the saw may be passed through the slot, and, as such a slot weakens the construction, a plate 15 is preferably bolted across each slot.

A series of clamps, or work holders are mounted on the carrier 22, eight being shown in the present instance, although this number may be increased or diminished, as may be desirable, and, as they are all identical, a description of one will suffice.

Each holder comprises a base plate 46, having an upright portion 47 in which a pair of horizontal parallel guide rods 48 are mounted, and arranged so that the line midway therebetween and parallel thereto is approximately a radial line from the center of rotation of the carrier 22 on which the holder is mounted, and to which it is secured by bolts 49, passing through slots 46' in the holder base, and extending approximately parallel to rods 48. A carriage 50 is mounted on said rods 48 and is provided with a vertically disposed work-engaging face 51 on its front side. An adjusting screw 52, having right and left threads, respectively, on the opposite portions thereof, is swiveled in said carriage and has clamping jaws 54 threaded on said opposite portions, so that said jaws may be adjusted toward, or from each other by said screw, and will always be held equidistant from a point midway therebetween. A worm gear 56 is mounted on the end of said screw and arranged in mesh with a similar gear 58 on a shaft 59, provided with a hand wheel 60 on its end. A feed screw 62 is swiveled in the upright portion 47 of the base plate 46, and is provided with a threaded connection with the carriage 50 by means of a pair of levers 64, threaded on their adjacent sides, and pivoted on a bolt 68, mounted in the carriage directly above the screw 62, said levers being normally held in engagement with the screw 62 by a spring 70, interposed therebetween, conveniently arranged handles 66 being formed on said levers at their upper ends, so that, when said handles are pressed together against the spring action, the nut-members will be thrown out of engagement with screw 62. A stop screw 72 is threaded in the base plate 46 and has a conical end adapted to enter the space between the ends of said levers 64, when the latter are fed forward to a certain position, and to act as a wedge to press them laterally out of engagement with the feed screw, so that the latter may rotate without causing feeding action of the carriage.

The means for causing automatic rotation of the screw 62 is shown in detail in Fig. 14, and comprises a ratchet wheel 74 secured on the outer end of the screw 62 and an actuating lever 76 pivoted on the screw at one side of the wheel 74, said lever having a driving pawl 78 thereon arranged to engage the ratchet and drive the screw in a direction to feed the carrier 50 inward when swung aside, as to the dotted line position of Fig. 14, said lever being arranged to engage one or more projecting lugs, as 80, on the table 14, as the carrier 22 is rotated. To provide means for varying the extent of throw of the lever 76, when it is carried over a lug 80, a spring arm 82 is secured thereto at the side which engages the lug and a screw 84 is arranged therein to hold said spring at certain positions. The lever 76 is normally held by its gravity in a vertical position, so that, when it is carried over the lug, the distance which it will be swung will be increased by adjusting the spring away from the lever arm. As the lever 76 would also drag over the gear 30, a guard 81 is provided over the latter, to prevent such engagement, and in so doing said guard will cause an inward feeding movement of each carriage inwardly after it passes the band saw 10.

Two rods 86 and 88 are mounted on the frame within the inner periphery of the carrier 22 and of table 14, a bracket 90 being mounted to swing horizontally on the rod 86, and a pair of brackets 92 and 94 being mounted to swing in like manner on the rod 88. The brackets 90, 92 and 94 have shafts 91, 93 and 95 respectively journaled therein in vertical position, said shafts having pulleys 96, 98, and 100 thereon, respectively, which are driven by belts 102, 104 and 106 running from pulleys on the main shaft about spring-actuated belt tighteners 103, 105 and 107, so that a constant tension is maintained on said belts in the different positions of the pulleys over which they pass. Rotary cutters 108, 110 and 112 are, respectively, mounted on the upper ends of the shafts 96, 98 and 100. The outward swinging movements of said brackets are limited by stop screws 114, 116 and 118, which are mounted in uprights on the horizontal supporting portion of the frame.

The inner end of each base-plate 46 is provided with three removable cam-plates 120, 122, and 124 arranged one above the other and cam rolls 121, 123, and 125 are mounted to rotate freely, concentrically with the shafts 96, 98 and 100, on the brackets 90, 92 and 94 in position to roll over said cam plates, respectively, thereby to control the positions of said cutters with relation to the work held by the jaws 54, the stop screws 114, 116 and 118 being adjusted to prevent outward swinging movement of the brackets at points where the cam-rolls do not engage the cam plates.

In operating the machine, suitably shaped blocks of wood are provided, the length of which is equal to the length of the shank-stiffeners to be formed, and the height of which is equal to that of the sum of the widths of a plurality (4 for example, as shown) of said stiffeners, the width thereof depending, to a considerable extent, on the width of block which the machine is adapted to receive. The grain of the wood must run in the direction of what is here termed the "length", or longitudinally of the block.

One of these blocks is placed in position in each work holder, so that one side thereof is held against its face 51 and its ends are firmly gripped by the jaws 54 which are forced into engagement therewith, the grain of the wood running horizontally, when in this position from jaw to jaw. The width of the blocks will be such that, when the work holders are withdrawn to their fullest extent, the inner sides thereof will project beyond the inner periphery of the carrier 22, and in position to be engaged by the downwardly moving portion of the band saw 10.

In Figs. 10, 11, 12 and 13, different forms of stiffeners are illustrated, and assuming that the form of Fig. 10 is to be produced, which has a transversely rounded or convex surface on the side which is its under side, in a shoe, and beveled ends, the cutters 110, and 112, only, will be employed. As the machine is driven so that the carrier 22 is moved circularly in the direction of the arrow in Fig. 1, the inner side portion of a block will be carried into engagement with the band-saw, which will remove a slab from end to end thereof, and form a uniformly concave surface thereon, as shown in Fig. 7. The block will then be carried into engagement with the cutter 112 on the shaft 95, said cutter being cylindrical and being guided by its cam 124, so that it forms beveled surfaces at each end of the concave face on the blocks, as indicated in Fig. 8. The block is then carried into engagement with the cutter 110, which, to form the stiffener of Fig. 10, consists of a series of cutters, having concaved edges, as shown in Fig. 3, so that it forms a series of convex ribs from one end to the other of the block, leaving the latter in the form shown in Fig. 9.

As the carrier continues its movement, it carries the lever 76, on the feed screw of the particular holder carrying the block just operated on, into engagement with the lugs 80 on the table, said screw having previously also been actuated by the guard 81 to some extent, so that the holder clamp is fed inward to an extent corresponding to the desired thickness of the stiffener. As a result, when the block is carried around into engagement with the band-saw again, the ribs thus formed will be severed, forming a new concave surface on the inner side of the block. The convex surfaces, formed by the cutter 110, extend to the back of the stiffeners to be formed, so that the bottoms of the grooves formed between the ribs, as shown in Fig. 9, will meet the next cut of the band saw, and, as a result, each rib, when thus severed, will become a separate stiffener.

A suitable receptacle is, in practice, provided directly beneath the point where the blocks move out of engagement with the band saw.

If a stiffener of the type shown in Fig. 11, and having a transversely flat surface on its lower side and beveled longitudinal edges, is desired, then the cutter 108 having V-shaped teeth such as is shown in Fig. 15, will be employed on the shaft 91, which will form beveled grooves in the face of the block, just before it passes into engagement with the band saw. In this case the cutter which forms these grooves is held in one position, with relation to the path of the carrier, by the cam-plate 26, or its stop screw 114, but in case it is desired to form a stiffener which is narrower at the middle portion than at the ends, as in Fig. 12, a cam plate of different form will be provided, which will cause the bracket 90 to be swung outward during the first half portion of its engagement and then inward during the last half, so that the middle portion of its cut will be deeper than the thickness of the stiffener. Also, to produce a stiffener of the form shown in Fig. 13, which is similar to that in Fig. 10, but has one end rounded, all the cutters above described will be employed, but a form of guiding cam for the bracket 90 will be employed which will hold the cutter 108 out of engagement of the block until the block has nearly passed the cutter, and then will permit it to swing out quickly, so that it rounds off the corners of the ribs previously formed. Other forms of stiffeners may be formed in a similar manner. As the grain of the wood runs from end to end of the blocks, obviously it will run, as nearly as possible, longitudinally of the shank-stiffeners which are produced.

If it is desired to increase the curvature of the stiffeners, i. e., to reduce the radius of the longitudinal curve on which their sides are formed, the table 14 will be adjusted rearwardly, so that the center about which the carrier 22 moves will be carried toward the band saw. If this is done, however, it is desirable to adjust the work holders inwardly on the carrier to a corresponding extent, and in this connection, it is noted that the slots 46' through which the bolts 49 pass, preferably are made slightly larger than the bolts, to permit the holders to be adjusted in a slightly oblique position to the radial position, thereby enabling the cutter 112 to form a longer bevel on one end of the stiffener than on the other, without changing its guiding cam.

The action of the wedging screw 72 in throwing the threaded faced levers 64 out of engagement with the feed screw 48, prevents the carriage 50 from being fed inwardly so far that it will engage the band saw.

While the above described embodiment of my invention is the best form thereof, of which I am at present aware, various changes may be made therein without departing from the spirit and scope of my invention.

I claim:—

1. A machine for making wood shank stiffeners, comprising an annular, circularly driven carrier having a series of radially movable carriages thereon, each adapted to hold a wood block with its side-portion projecting inwardly therefrom, automatic means to feed each carriage, inwardly successively, a distance corresponding to the thickness of the stiffener to be formed, on each rotation of the carrier, a band-saw having its working portion arranged to be driven within said carrier in position to sever a portion of each block as it is carried thereby and form a curved face thereon, and a rotary cutter arranged to be driven within said carrier in position to form a series of ribs on the faced side of each block as it is carried thereby, so that said ribs may be subsequently severed by the saw.

2. A machine for making wood-shank stiffeners comprising a carrier having means to move the same in an endless path, supporting means on said carrier, arranged to hold the work to project within said path, a band-saw having its working portion arranged to travel vertically within said path in position to sever an inwardly projecting portion of the work and form a face thereon as it is carried past said saw, a cutter mounted to rotate about a vertical axis within said path and in position to engage said face to form longitudinal ribs thereon, as the work is carried past the cutter, and automatic means to move said cutter transversely of its axis while in engagement with the work.

3. A machine for making wood-shank stiffeners comprising a carrier having means to move the same continuously in a circular path, a carriage on said carrier adapted to hold a block of wood with its side-portion projecting within said path, a continuously driven band-saw having its working portion arranged to travel within said path in position to sever a portion of the block as it is carried thereby, and form a curved face thereon corresponding to the inner side of the stiffeners to be formed, a cutter mounted to rotate about an axis within said path and continuously driven to form a series of ribs on said faced side of the block, automatic means to move the cutter transversely of its axis, as said carriage is carried past it, and automatic means to feed the carriage toward the axis about which it is moved.

4. A machine for making wood-shank stiffeners comprising a carrier having means to move the same continuously in a circular path, a carriage on said carrier adapted to hold a block of wood with its side-portion projecting within said path, a continuously driven band-saw having its working portion arranged to travel within said path in position to sever a portion of a block as it is carried by the carriage and form a curved face thereon corresponding to the inner side of the stiffeners to be formed, a cutter mounted within said path to move transversely of its axis into engagement with the block, means carried by the carrier to vary the position of the cutter relative thereto, and means, automatically operated between successive engagements of the saw with the block, to feed the carriage inwardly to a predetermined extent.

5. A machine for making wood-shank stiffeners comprising a horizontally disposed table, an annular carrier mounted thereon, a radially adjustable block-holding carriage mounted on said carrier, a vertically disposed band-saw arranged to be driven exteriorly and interiorly of the carrier to engage the work held by said carriage within the path of movement of the latter, a rotary cutter arranged to engage the work subsequently to its engagement with said saw, and means to adjust said table and the carrier thereon to vary the distance between the axis of the carrier and the saw.

6. A machine for making wood-shank stiffeners comprising a circularly moving carrier having a wood-holding carriage thereon mounted for adjustment to and from the axis of the carrier, a screw on the carrier for feeding said carriage, an arm connected thereto, a stationary abutment arranged to be engaged by said arm, to cause predetermined feeding movement, of the screw, automatic means to disengage said screw and the carriage when the latter has been fed inwardly to a predetermined extent and a saw arranged to move in a fixed path to engage the work as it is carried by said carriage.

In testimony whereof, I have signed my name to this specification.

JOHN O. PARKER.

Witness:
L. H. HARRIMAN.